US011795657B2

(12) United States Patent
Son et al.

(10) Patent No.: US 11,795,657 B2
(45) Date of Patent: Oct. 24, 2023

(54) COUNTERWEIGHT MOUNTING DEVICE AND WORKING MACHINE HAVING THE SAME

(71) Applicant: HYUNDAI CONSTRUCTION EQUIPMENT CO., LTD., Seoul (KR)

(72) Inventors: Jin Woo Son, Seoul (KR); Min Seok Kim, Seoul (KR)

(73) Assignee: HD HYUNDAI CONSTRUCTION EQUIPMENT CO., LTD., Seoul (KR)

( * ) Notice: Subject to any disclaimer, the term of this patent is extended or adjusted under 35 U.S.C. 154(b) by 467 days.

(21) Appl. No.: 17/072,033

(22) Filed: Oct. 16, 2020

(65) Prior Publication Data

US 2021/0270011 A1    Sep. 2, 2021

(30) Foreign Application Priority Data

Mar. 2, 2020    (KR) .................. 10-2020-0026209

(51) Int. Cl.
| | |
|---|---|
| *E02F 9/18* | (2006.01) |
| *E02F 9/22* | (2006.01) |
| *B66C 23/72* | (2006.01) |
| *B66F 9/075* | (2006.01) |
| *B62D 49/08* | (2006.01) |
| *B66C 23/76* | (2006.01) |

(52) U.S. Cl.
CPC .............. *E02F 9/18* (2013.01); *B62D 49/085* (2013.01); *B66C 23/72* (2013.01); *B66F 9/07554* (2013.01); *E02F 9/22* (2013.01); *B66C 23/76* (2013.01)

(58) Field of Classification Search
CPC ..... E02F 9/18; B62D 49/0628; B62D 49/085; B66C 23/72; B66C 23/74; B66C 23/76; B66F 9/07554
See application file for complete search history.

(56) References Cited

U.S. PATENT DOCUMENTS

| | | |
|---|---|---|
| 2,759,563 A | 8/1956 | Marnon et al. |
| 3,043,460 A | 7/1962 | Laurencin |
| (Continued) | | |

FOREIGN PATENT DOCUMENTS

| | | |
|---|---|---|
| EP | 1 308 413 | 5/2003 |
| JP | 7-268908 | 10/1995 |
| (Continued) | | |

OTHER PUBLICATIONS

Extended European Search Report dated Mar. 23, 2021 for European Patent Application No. 20202230.7.

*Primary Examiner* — Gary S Hartmann
(74) *Attorney, Agent, or Firm* — Ladas & Parry, LLP (57) ABSTRACT

A counterweight mounting device, which is installed on a frame supporting a counterweight, includes a first link of which a lower end is coupled to the frame so that the first link is rotatable about a first hinge shaft, a second link including a slot guide into which a second hinge shaft coupled to an upper end of the first link is inserted and in which the second hinge shaft slides, a hydraulic cylinder of which a lower end is coupled to the frame so that the hydraulic cylinder is rotatable about a cylinder rotation shaft and an upper end is coupled to the second hinge shaft and rotates the first link, and a connection member installed on an upper end of the second link and connected to the counterweight.

9 Claims, 9 Drawing Sheets

(56) References Cited

U.S. PATENT DOCUMENTS

| | | | |
|---|---|---|---|
| 3,945,518 A | 3/1976 | Inoue | |
| 7,669,898 B2 * | 3/2010 | Hamaguchi | E02F 9/18 |
| | | | 280/759 |
| 7,896,178 B2 * | 3/2011 | Davis | B66C 23/365 |
| | | | 212/196 |
| 8,434,787 B2 | 5/2013 | Halepatali et al. | |
| 8,702,061 B2 | 4/2014 | Suzuki et al. | |
| 2007/0122261 A1 | 5/2007 | Hamaguchi et al. | |
| 2007/0221600 A1 | 9/2007 | Davis | |
| 2010/0102016 A1 | 4/2010 | Davis | |
| 2012/0315121 A1 | 12/2012 | Halepatali et al. | |
| 2017/0051473 A1 | 2/2017 | Rutherford | |
| 2017/0210432 A1 | 7/2017 | Cartechini | |

FOREIGN PATENT DOCUMENTS

| | | | | |
|---|---|---|---|---|
| JP | 08319637 A * | 12/1996 | | E02F 9/18 |
| JP | 9-12278 | 1/1997 | | |
| JP | 10-195927 | 7/1998 | | |
| JP | 2002081095 A * | 3/2002 | | E02F 9/18 |
| JP | 2002-167807 | 6/2002 | | |
| JP | 2006-44948 | 2/2006 | | |
| JP | 3882867 | 2/2007 | | |
| JP | 2007-162454 | 6/2007 | | |
| JP | 2008-254860 | 10/2008 | | |
| JP | 2012-57299 | 3/2012 | | |
| JP | 5527769 | 6/2014 | | |
| JP | 2016-044512 | 4/2016 | | |
| JP | 2016-160651 | 9/2016 | | |
| KR | 2002052710 A * | 7/2002 | | E02F 9/18 |
| KR | 10-2009-0069376 | 7/2009 | | |
| KR | 10-2010-0070717 | 6/2010 | | |
| KR | 10-2012-0071259 | 7/2012 | | |
| KR | 10-2012-0071785 | 7/2012 | | |
| KR | 10-2013-0004149 | 1/2013 | | |
| KR | 10-2014-0076175 | 6/2014 | | |
| KR | 10-1552554 | 9/2015 | | |
| KR | 10-2016-0142584 | 12/2016 | | |
| WO | 2014/092367 | 6/2014 | | |
| WO | WO-2016030427 A1 * | 3/2016 | | B66C 23/74 |
| WO | 2017/061646 | 4/2017 | | |

* cited by examiner

COUNTERWEIGHT MOUNTING DEVICE AND WORKING MACHINE HAVING THE SAME

This application claims priority to and the benefit of Korean Patent Application No. 10-2020-0026209, filed on Mar. 2, 2020, the disclosure of which is incorporated herein by reference in its entirety.

BACKGROUND

1. Field of the Invention

The present invention relates to a counterweight mounting device and a working machine having the same.

2. Discussion of Related Art

Generally, working machines such as wheel loaders and excavators transmit, load, and unload heavy things. Since a working target object of the working machine is heavy and a front working part of the working machine is also heavy, a counterweight is mounted on the working machine to balance against a weight of the working machine or an external force applied to the working machine.

Since an operation of demounting the counterweight from or mounting the counterweight on the working machine may be frequently performed, a device capable of simply and quickly mounting the counterweight on the frame of the working machine is required. The device for mounting the counterweight is a counterweight mounting device.

However, a weight of the counterweight continuously affects the counterweight mounting device so that the counterweight mounting device is deformed or damaged. For example, in order to mount the counterweight on the frame, the counterweight is assembled to the frame in a state in which the counterweight is hanged on the counterweight mounting device or is assembled in a state in which the counterweight is loaded on an upper surface of the frame. However, in the case of the former, the counterweight mounting device may be deformed or destroyed.

In addition, in a case in which the counterweight is transferred by a fixed link, the counterweight may not be in contact with the upper surface of the frame. Since a magnetic force generation device or an additional hydraulic cylinder for vertically transferring the counterweight is required to solve this problem, an additional cost may be required, and thus improvement is required.

SUMMARY OF THE INVENTION

The present invention is directed to providing a counterweight mounting device which is economical and allows a counterweight to be accurately and safely transferred and a working machine having the same.

According to an aspect of the present invention, there is provided a counterweight mounting device installed on a frame supporting a counterweight. The counterweight mounting device includes a first link of which a lower end is coupled to the frame so that the first link is rotatable about a first hinge shaft, a second link including a slot guide into which a second hinge shaft coupled to an upper end of the first link is inserted and in which the second hinge shaft slides, a hydraulic cylinder of which a lower end is coupled to the frame so that the hydraulic cylinder is rotatable about a cylinder rotation shaft and an upper end is coupled to the second hinge shaft and rotates the first link, and a connection member installed on an upper end of the second link and connected to the counterweight.

The counterweight mounting device may further include a third link of which one end is rotatably coupled to the first link and the other end is rotatably coupled to a lower end of the second link, and a fourth link of which one end is rotatably coupled to the frame and the other end is rotatably coupled to the lower end of the second link.

A third hinge shaft coupled to the lower end of the second link may be coupled to the third link and the fourth link.

The first to fourth links may be provided in pairs at left and right sides around the hydraulic cylinder.

The counterweight mounting device may further include a bracket which is fixedly coupled to the frame and to which the first link, the fourth link, and the hydraulic cylinder are rotatably coupled.

An upper end of the hydraulic cylinder may be coupled to a center of the second hinge shaft.

The connection member may be provided as a chain, a rope, or a combination thereof having a predetermined length.

According to another aspect of the present invention, there is provided a working machine including the counterweight mounting device.

The frame may be provided on an upper rotation body of an excavator.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Purposes, specific advantages, and novel features of the present invention will be clear from exemplary embodiments and the following detailed descriptions in connection with the accompanying drawings. In this specification, when reference numerals are assigned to components of each drawing, it should be noted that the same numerals are assigned to the same components even when the same components are illustrated in different drawings whenever possible. In descriptions of the present invention, when detailed descriptions of related well-known technology are deemed to unnecessarily obscure the gist of the present invention, they will be omitted.

Hereinafter, exemplary embodiments of the present invention will be described with reference to the accompanying drawings in detail.

The present invention relates to a counterweight mounting device and a working machine having the same which will be described below, and the working machine of the present invention is not limited to types such as an excavator, a loader, a forklift, and the like on which a counterweight is mounted. In addition, the counterweight mounting device may be installed on and separated from the working machine.

Figure 1:
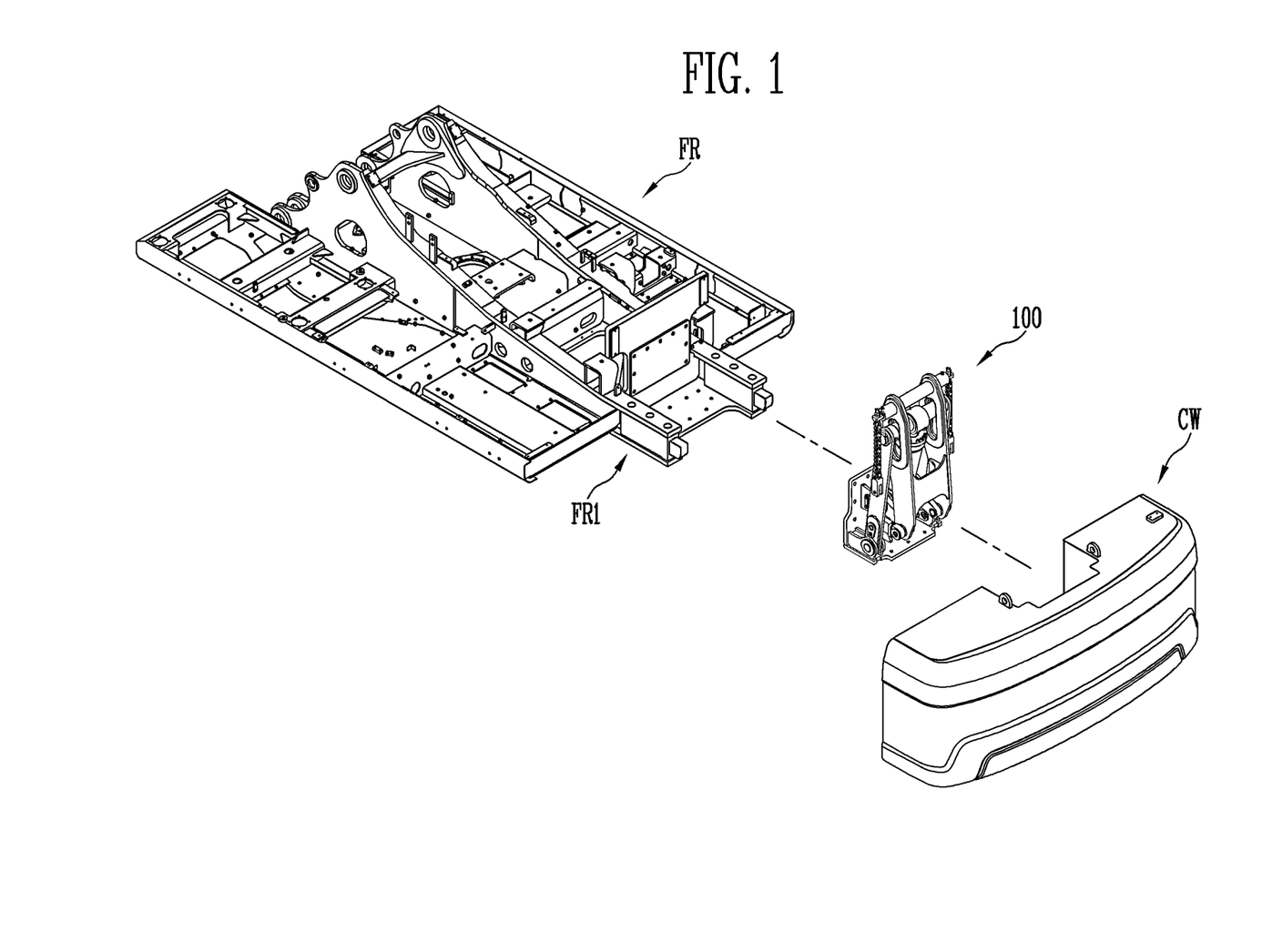
FIG. 1 is an exemplary view illustrating a counterweight mounting device and a frame of a working machine having the same according to one embodiment of the present invention.
Figure 2A:
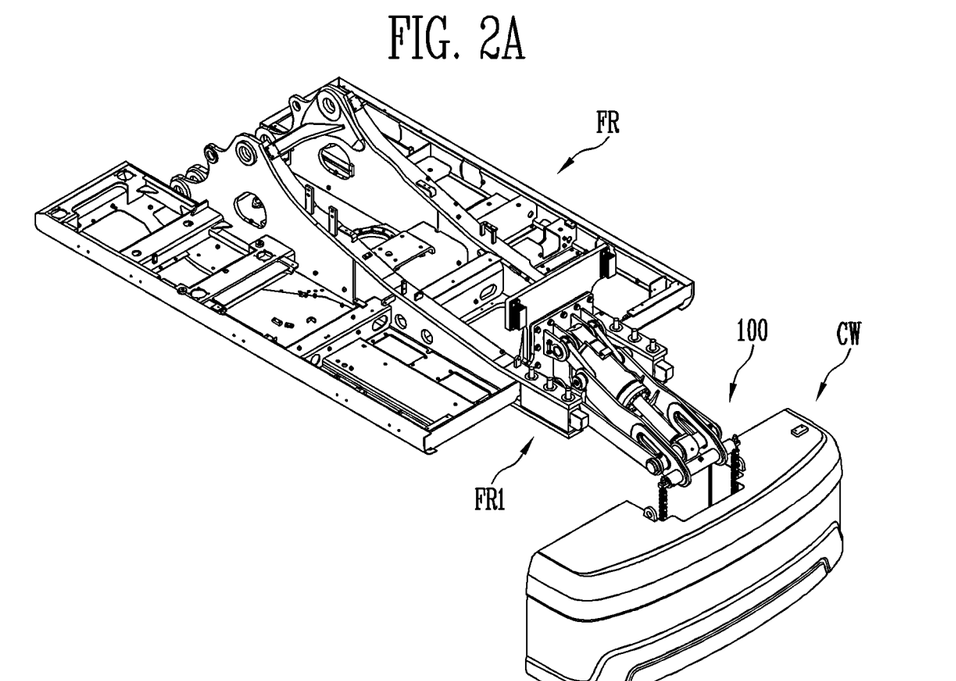
FIG. 2A is a view illustrating a state in which a counterweight is seated on a ground surface using the counterweight mounting device of FIG. 1.
Figure 2B:
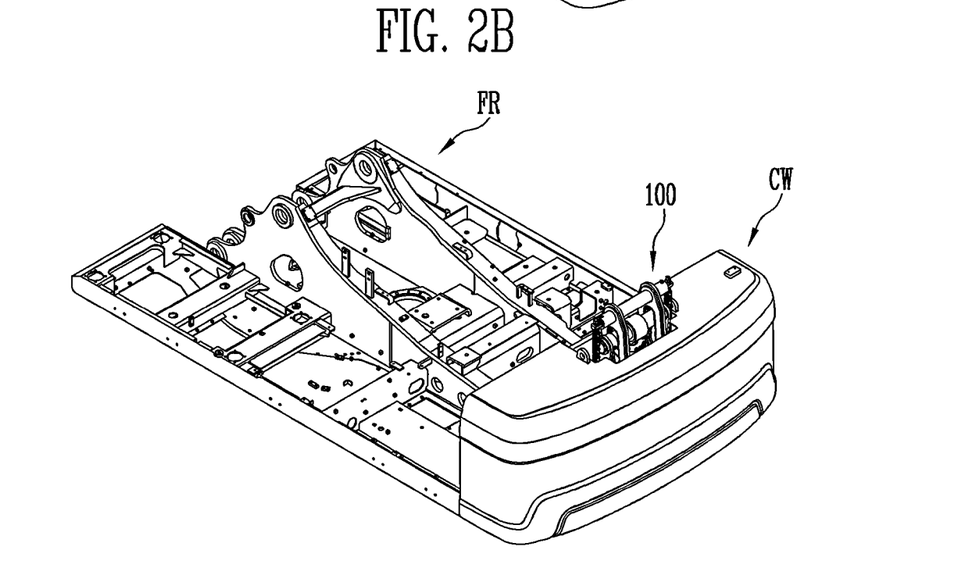
FIG. 2B is a view illustrating a state in which the counterweight is lifted and seated on the frame.

FIG. 1 is an exemplary view illustrating a counterweight mounting device and a frame of a working machine having the same according to one embodiment of the present invention, FIG. 2A is a view illustrating a state in which a counterweight is seated on a ground surface using the counterweight mounting device of FIG. 1, and FIG. 2B is a view illustrating a state in which the counterweight is lifted and seated on the frame.

Referring to FIGS. 1, 2A, and 2B, the working machine according to the present embodiment may include a frame FR, a counterweight CW, and a counterweight mounting device 100.

As described above, the working machine commonly refers to an excavator, a loader, a forklift, and the like on which the counterweight CW may be mounted, and in the present embodiment, an example of the working machine will be described using the excavator.

The frame FR may be provided on an upper rotation body of the excavator. That is, the frame FR may be rotatably installed above a lower running body of the excavator. An excavator bucket (not shown), which is a working part, and an operating room (not shown) may be positioned in front of the frame FR, and the counterweight CW and the counterweight mounting device 100 for mounting the counterweight CW may be positioned behind the frame FR.

In addition, the frame FR may include a counterweight rack FR1 on which the counterweight CW is seated. The counterweight rack FR1 may be a portion disposed behind an engine part (not shown). However, the frame FR may be a part of a chassis of the working machine or may also be a structure formed separately from the chassis of the working machine.

The counterweight CW is a counterweight body for balancing against a weight of an apparatus or an external force applied to a machine. By mounting the counterweight CW, a load of the working machine may be uniformly dispersed so that working stability may be secured and operation may be easily performed. The counterweight CW may include a case and a filler filling the case, the counterweight CW refers to a known technology, and the description thereof will be omitted in this specification.

The counterweight mounting device 100 is provided behind the frame FR, that is, at an opposite side of the front thereof at which a working part is positioned, and is a device configured to detachably mount the counterweight CW on the frame FR. Specifically, the counterweight mounting device 100 may tow the counterweight CW and load the counterweight CW on the frame FR or may separate and unload the counterweight CW loaded on the frame FR therefrom.

The counterweight mounting device 100 of the present invention may use a combination of a multilink structure and a single cylinder and chain structure to pull the counterweight CW. The counterweight mounting device 100 has a structure in which the link structure is rotated in conjunction with operation of a cylinder to mount the counterweight CW on the frame FR.

Figure 3:
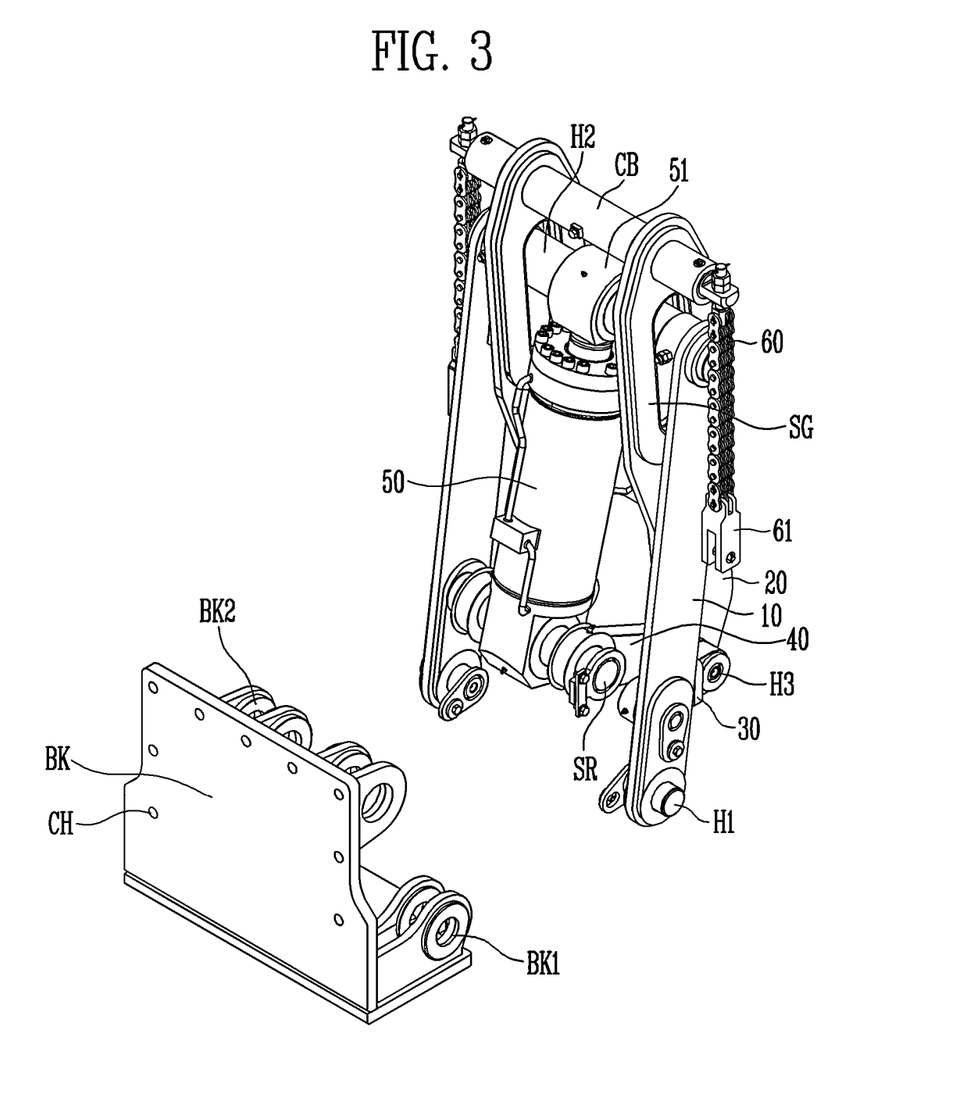
FIG. 3 is a perspective view illustrating the counterweight mounting device according to one embodiment of the present invention.
Figure 4A:
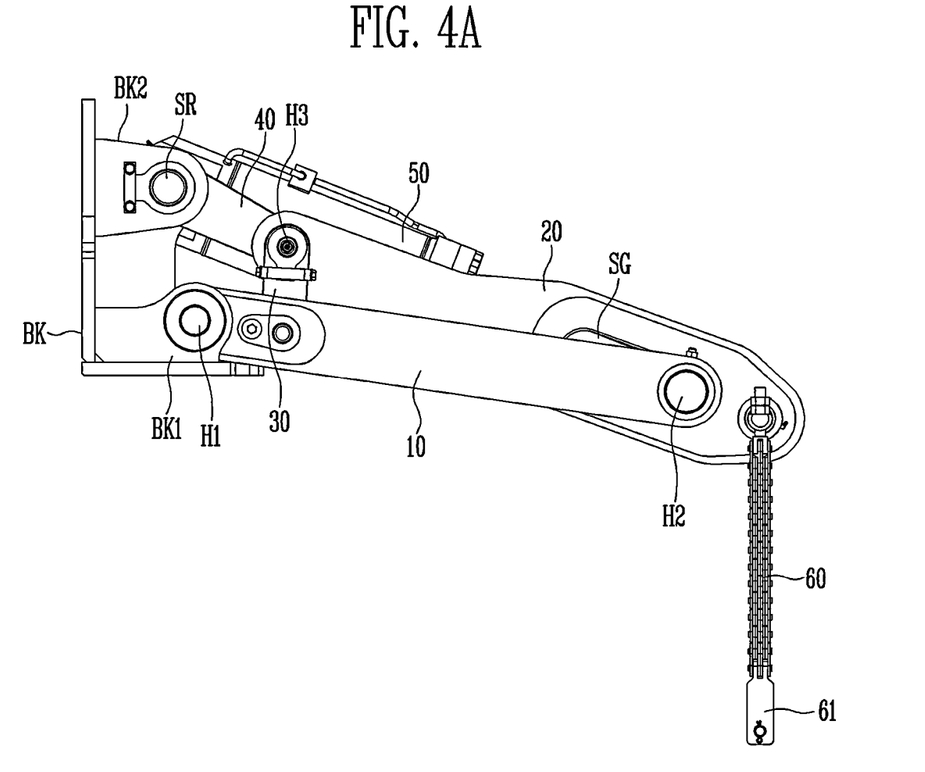
FIGS. 4A to 4C are side views for describing operation of the counterweight mounting device of FIG. 3.
Figure 4B:
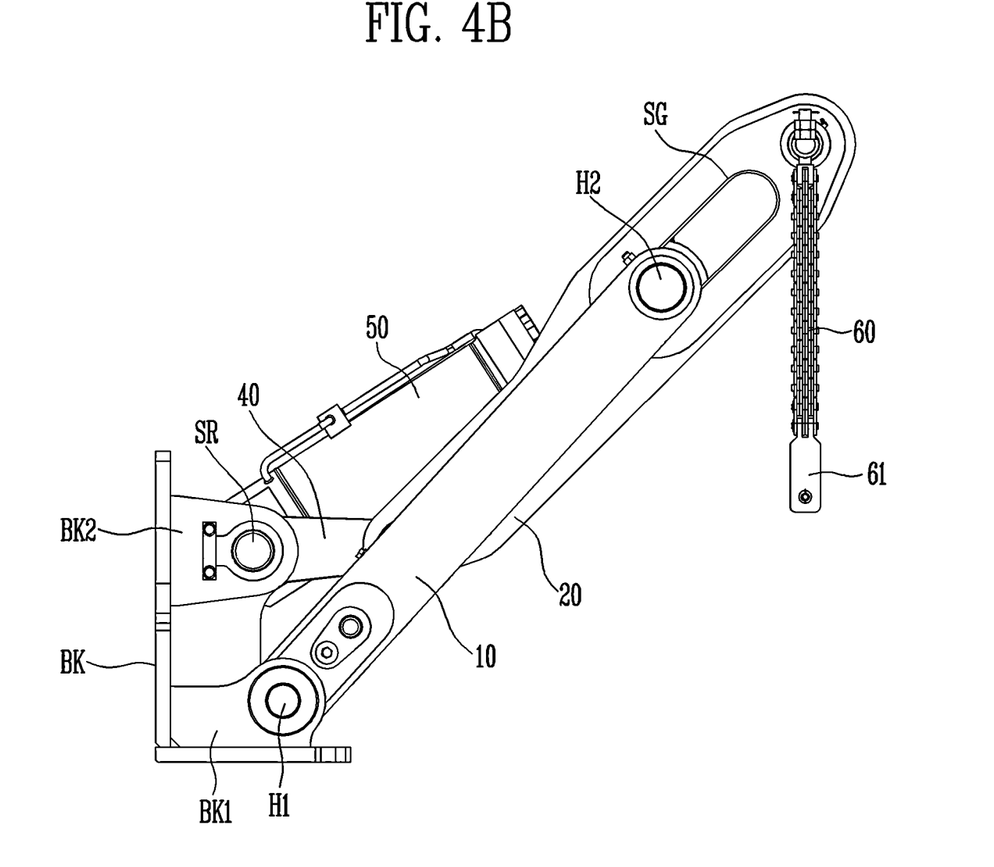
Figure 4C:
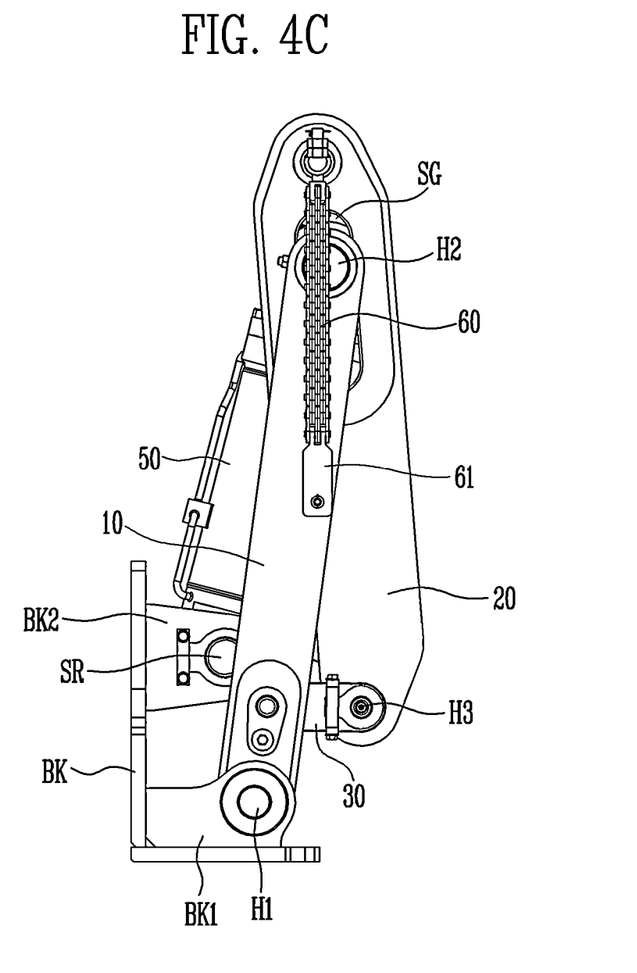

FIG. 3 is a perspective view illustrating the counterweight mounting device according to one embodiment of the present invention, and FIGS. 4A to 4C are side views for describing operation of the counterweight mounting device of FIG. 3.

Referring to FIGS. 3 and 4A to 4C, the counterweight mounting device 100 according to one embodiment of the present invention may include first links 10, second links 20, third links 30, fourth links 40, a hydraulic cylinder 50, and connection members 60.

In this case, the first to fourth links 10, 20, 30, and 40 may be provided in pairs at left and right sides around the hydraulic cylinder 50. Since one pair of links are laterally symmetrical and are rotated in the same manner, hereinafter, one component will be mainly described for the convenience in the description.

The counterweight mounting device 100 may further include a bracket BK for coupling the link structure and the hydraulic cylinder 50 to the frame FR. One side of the bracket BK may be fixedly coupled to the frame FR, and the other side thereof may be fixed to the link structure and the hydraulic cylinder 50 so that the link structure and the hydraulic cylinder 50 are rotated.

For example, the bracket BK may have a plate shape of which a cross section has a bent "L" shape and include first connection parts BK1 coupled to the first links 10 and second connection parts BK2 coupled to the fourth links 40 and the hydraulic cylinder 50. In addition, the bracket BK may include a plurality of coupling holes CH coupled to the frame FR using bolts and the like.

A lower end of the first link 10 is coupled to the frame FR so that the first link 10 is rotatable about a first hinge shaft H1. Specifically, the first link 10 is a rod shaped member having a predetermined length and is positioned at an outermost position in the link structure. In addition, the lower end of the first link 10 is coupled to the first connection part BK1 of the bracket BK to be rotatable about the first hinge shaft H1, and an upper end of the first link 10 is coupled to the second link to be rotatable about a second hinge shaft H2. However, the upper end of the first link 10 is coupled to the second link 20 to be rotatable about and slidable in the second link 20 due to the slot guide SG.

The second link 20 includes the slot guide SG, for example, the slot guide SG may have a longitudinally extending shape, and the second hinge shaft H2 coupled to the upper end of the first link 10 is inserted into and slides in the slot guide SG. Specifically, the second link 20 is a rod shaped member having a predetermined length and is positioned between the first link 10 and the hydraulic cylinder 50. In addition, an upper end of the second link 20 is moved in conjunction with the upper end of the first link 10 to be rotatable about the second hinge shaft H2 rotating in the slot guide SG, and a lower end of the second link 20 is coupled to the third link 30 to be rotatable about a third hinge shaft H3.

In this case, the slot guide SG is formed to have a long hole shape in a longitudinal direction of the second link 20 and guides sliding of the second hinge shaft H2 perpendicularly passing through the slot guide SG. In addition, the second hinge shaft H2 is coupled to connect the pair of first links 10. That is, both ends of the second hinge shaft H2 are coupled to the first links 10, and an inner side of the second hinge shaft H2 is inserted into the slot guide SG and coupled to the second link 20. In addition, an upper end of the hydraulic cylinder 50 is coupled to a center of the second hinge shaft H2.

According to such a structure, the first link 10 and the second link 20 are rotated in conjunction with each other. For example, when the hydraulic cylinder 50 extends, the second hinge shaft H2 is pushed and slides outward. Conversely, when the hydraulic cylinder 50 is shortened, the second hinge shaft H2 is pulled and slides inward. In addition, the second link 20 is formed to be rotatable about the first link 10 regardless of sliding of the second hinge shaft H2.

One end of the third link 30 is rotatably coupled to the first link 10, and the other end of the third link 30 is rotatably coupled to the lower end of the second link 20. Specifically, the third link 30 may be positioned between the lower end of the first link 10 and the lower end of the second link 20 and have a length less than the lengths of the first link 10 and the second link 20. One end of the third link 30 is rotatably installed at the lower end of the first link 10, and the other end of the third link 30 is coupled to the lower end of the second link 20 to be rotatable about the third hinge shaft H3. Due to the third link 30, a rotation radius of the lower end of the second link 20 is restricted.

One end of the fourth link 40 is rotatably coupled to the frame FR, and the other end of the fourth link 40 is rotatably coupled to the lower end of the second link 20. Specifically, the fourth link 40 may be positioned between the lower end of the second link 20 and a lower end of the hydraulic cylinder 50 and have a length less that the lengths of the first link 10 and the second link 20. One end of the fourth link 40 is coupled to the lower end of the hydraulic cylinder 50 and the second connection part BK2 of the bracket BK to be rotatable about a cylinder rotation shaft SR, and the other end of the fourth link 40 is coupled to the lower end of the second link 20 to be rotatable about the third hinge shaft H3.

In this case, the third hinge shaft H3 may be coupled to the third link 30 and the fourth link 40. The third link 30 may be positioned outside the lower end of the second link 20, the fourth link 40 may be positioned thereinside, and the third hinge shaft H3 may be installed to be inserted into and pass through the third link 30 and the fourth link 40.

The lower end of the hydraulic cylinder 50 is coupled to the frame FR so that the hydraulic cylinder 50 is rotatable about the cylinder rotation shaft SR, and the upper end of the hydraulic cylinder 50 is coupled to the second hinge shaft H2 to rotate the first link 10. Specifically, the hydraulic cylinder 50 may include a cylinder body and a cylinder rod which is extendable from or retractable into the cylinder body in a length direction. The lower end of the hydraulic cylinder 50 is coupled to the second connection part BK2 of the bracket BK to be rotatable about the cylinder rotation shaft SR, and the upper end of the hydraulic cylinder 50 is coupled to a center of the second hinge shaft H2. For example, the cylinder body may be coupled to the bracket BK and the cylinder rod may be coupled to the second hinge shaft H2.

In this case, the lower end of the hydraulic cylinder 50 is installed at a position above a position of the first hinge shaft H1, and the first to fourth links 10, 20, 30, and 40 of the above-described structure are rotated in conjunction with each other in a complex manner according to extension and contraction operations of the hydraulic cylinder 50. Even though not specifically illustrated in the drawings, the hydraulic cylinder 50 may extend or contract due to a hydraulic oil supplied from a hydraulic pump provided in the working machine.

The connection member 60 is installed at the upper end of the second link 20 to be connected to the counterweight CW. One end of the connection member 60 may be coupled to the upper end, which is positioned above the slot guide SG, of the second link 20 using a shaft CB, and a coupling part 61 to be coupled to the counterweight CW may be positioned at the other end of the connection member 60. The connection member 60 has a chain structure extending in the direction of gravity and has a length not to be interfered with by the link structure when the counterweight CW is pulled. According to another embodiment, a connection member 60 may use a line, rope, or the like performing a similar function to the connection member.

An operation process of the counterweight mounting device 100 will be described below. First, as illustrated in FIG. 4A, the link structure is rotated rearward to pull the counterweight CW. In a state in which the hydraulic cylinder 50 extends to have a maximum length, the second hinge shaft H2 is pushed outward in the slot guide SG, and the first link 10 is laid substantially parallel to the ground surface.

As illustrated in FIG. 4B, when the hydraulic cylinder 50 contracts, the second hinge shaft H2 is pulled inward in the slot guide SG, the first link 10 is rotated about the first hinge shaft H1 due to complexly interconnected operation of the link structure, and the upper end of the of the first link 10 is moved upward. Accordingly, the counterweight CW connected to the connection member 60 is pulled upward.

Next, as illustrated in FIG. 4C, when the hydraulic cylinder 50 contracts to have a minimum length, a rotation radius of the hydraulic cylinder 50 is reduced, the second link 20 and the third and fourth links 30 and 40 are folded, and the first link stands to be substantially perpendicular to the ground surface.

In this case, during the process in which the hydraulic cylinder 50 contracts, an upper end portion of the second link 20 has a trajectory in which the upper end portion is moved upward to a highest point and moved downward therefrom. Accordingly, the counterweight CW is stably seated on the counterweight rack FR1 without being interfered with by the frame FR. Conversely, when the counterweight CW mounted on the frame FR needs to be separated therefrom, the above-described process will be performed in reverse.

Figure 5:
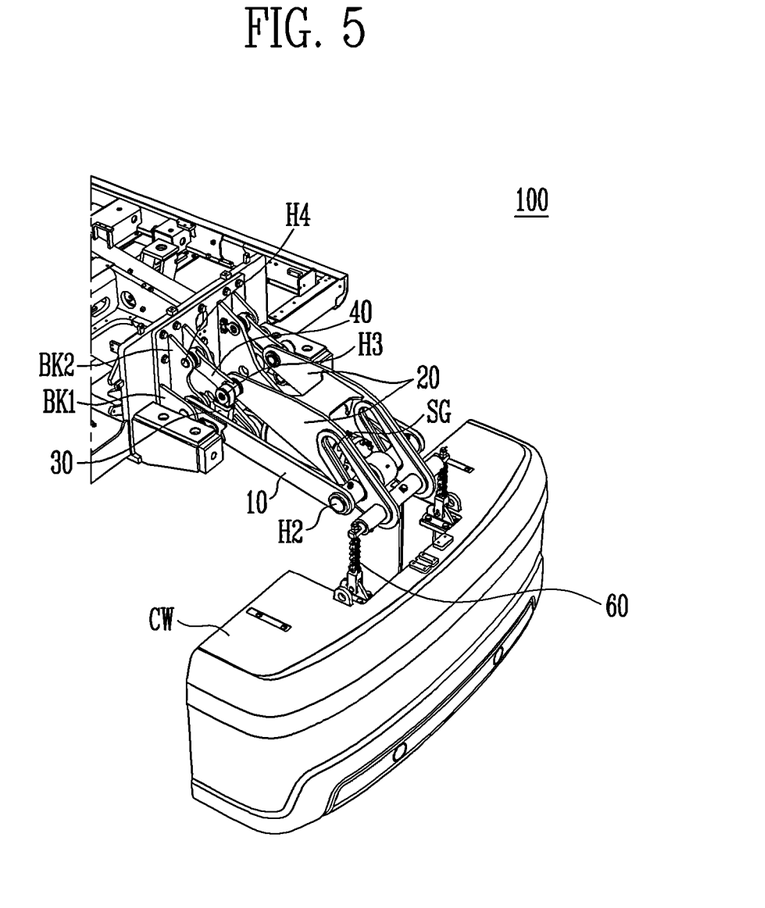
FIG. 5 is an exemplary view illustrating a counterweight mounting device and a frame of a working machine having the same according to another embodiment of the present invention.

FIG. 5 is an exemplary view illustrating a counterweight mounting device and a frame of a working machine having the same according to another embodiment of the present invention, and FIGS. 6 to 9 are side views for describing operation of the counterweight mounting device of FIG. 5.

Referring to FIGS. 5 to 9, the working machine may include a frame FR, a counterweight CW, and a counterweight mounting device 100.

In addition, the counterweight mounting device 100 according to another embodiment of the present invention may include a bracket BK, first links 10, second links 20, third links 30, fourth links 40, hydraulic cylinder 50, and connection members 60 and may be similar to the counterweight mounting device 100 according to the above-described embodiment.

In addition, the working machine according to the present embodiment may include the frame FR and a counterweight rack FR1 on which the counterweight CW is seated like the above-described working machine according to one embodiment.

However, there is a difference between the above-described working machine according to one embodiment and the working machine according to the present invention, wherein the difference is that the working machine according to the present invention further includes a third connection part BK3 and a fourth hinge shaft H4, and positions of the hydraulic cylinder 50 and a cylinder rotation shaft SR of the working machine according to the present invention are different from the positions of those of the above-described working machine according to one embodiment so that an operation in which the hydraulic cylinder 50 extends is performed differently from the operation of the above-described working machine according to one embodiment.

Accordingly, the repeated descriptions of the same components performing the same functions will be omitted, and the difference will be described.

The counterweight mounting device 100 according to the present embodiment may perform an operation in which the counterweight CW is pulled and loaded on the frame FR, or conversely, the counterweight CW loaded on the frame FR is separated therefrom and put down.

The counterweight mounting device 100 may use a combination of a multilink structure and a single cylinder and chain structure to pull the counterweight CW. The counterweight mounting device 100 has a structure in which the link structure is rotated in conjunction with operation of the cylinder to mount the counterweight CW on the frame FR.

In this case, the first to fourth links 10, 20, 30, and 40 may be provided in pairs at left and right sides around the hydraulic cylinder 50. Since one pair of links are laterally symmetrical and are rotated in the same manner, hereinafter, one component will be mainly described for the convenience in the description.

The counterweight mounting device 100 may further include a bracket BK for coupling the link structure and the hydraulic cylinder 50 to the frame FR. One side of the bracket BK may be fixedly coupled to the frame FR, and the other side thereof may be coupled to the link structure so that the link structure is rotated.

For example, the bracket BK may be formed to have a plate shape which is the same as or similar to that of the bracket BK according to one embodiment and may include first connection parts BK1 coupled to the first links 10 and second connection parts BK2 coupled to the fourth links 40.

A lower end of the first link 10 is coupled to the frame FR so that the first link 10 is rotatable about a first hinge shaft H1. The first link 10 may be formed to have a rod shape having a predetermined length, and the lower end of the first link 10 is coupled to the first connection part BK1 to be rotatable about the first hinge shaft H1, and an upper end of the first link 10 is coupled to the second link 20 to be rotatable about a second hinge shaft H2. However, the upper end of the first link 10 is coupled to the second link 20 to be rotatable about and slidable in the second link due to a slot guide SG.

In addition, since an upper end and a lower end may be changeable according to an operation state in the present embodiment, the present embodiment is not limited thereto.

The second link 20 includes the slot guide SG, and for example, the slot guide SG may have a longitudinally extending shape, and the second hinge shaft H2 coupled to the upper end of the first link 10 is inserted into and slides in the slot guide SG. The second link 20 is positioned between the first link 10, and the third link 30 and the fourth link 40. In addition, an upper end of the second link 20 is moved in conjunction with the upper end of the first link 10 to be rotatable about the second hinge shaft H2 rotating in the slot guide SG, and a lower end of the second link 20 is coupled to the third link 30 and the fourth link 40 to be rotatable about a third hinge shaft H3.

In this case, the slot guide SG is formed to have a long hole shape in a longitudinal direction of the second link 20 and guides sliding of the second hinge shaft H2 perpendicularly passing through the slot guide SG. In addition, the second hinge shaft H2 is coupled to connect one pair of first links 10. That is, both ends of the second hinge shaft H2 are coupled to the first links 10, and an inner side of the second hinge shaft H2 is inserted into the slot guide SG and coupled to the second link 20. In addition, an upper end 51 of the hydraulic cylinder 50 is coupled to a center of the second hinge shaft H2.

According to such a structure, the first link 10 and the second link 20 are rotated in conjunction with each other. For example, during a process in which a state of FIG. 6, in which the hydraulic cylinder 50 has a minimum length, is changed to a state of FIG. 9 in which the hydraulic cylinder 50 has a maximum length, the hydraulic cylinder 50 extends to mount the counterweight CW.

Figure 6:
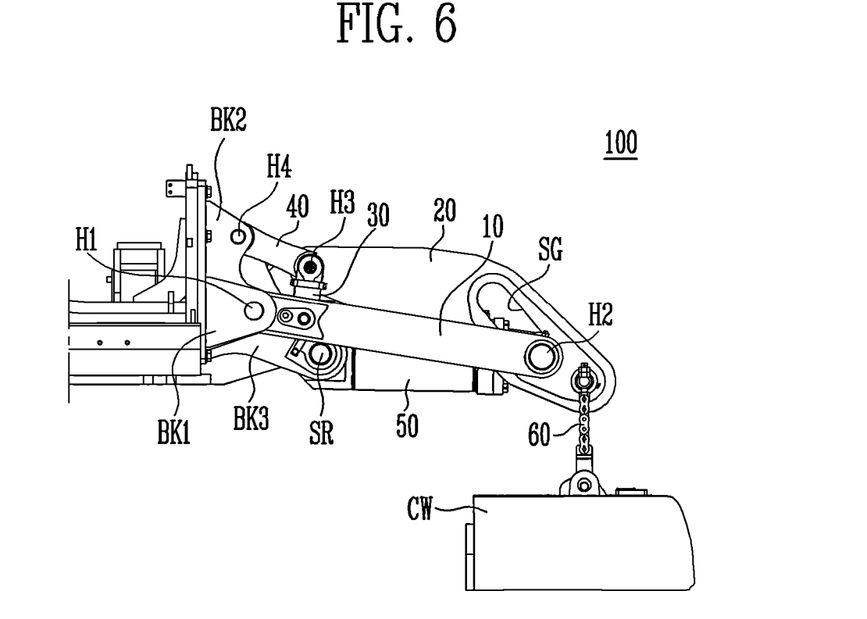
FIGS. 6 to 9 are side views for describing operation of the counterweight mounting device of FIG. 5.
Figure 9:
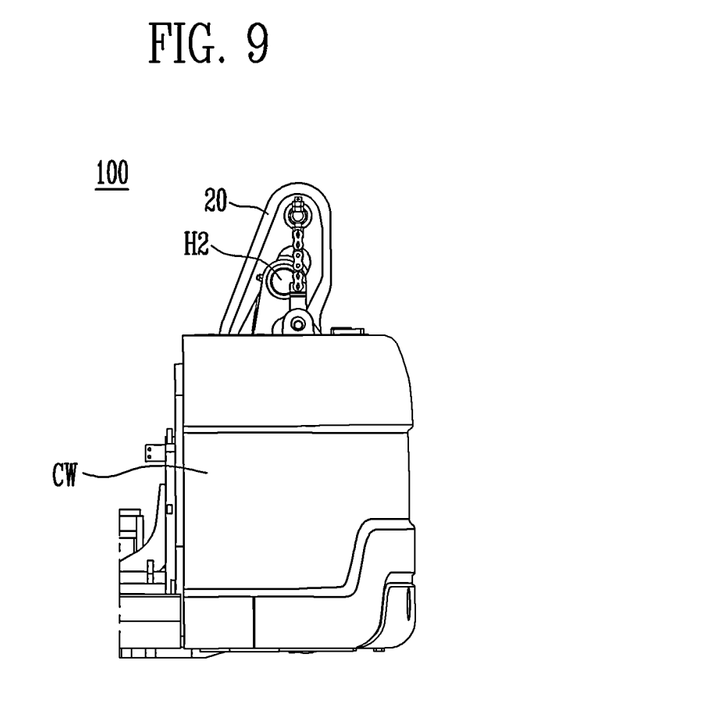

Accordingly, since the counterweight CW is mounted thereon when the hydraulic cylinder 50 extends unlike one embodiment, a force of the hydraulic cylinder 50 can be more effectively used than one embodiment, and this is because a force generated when the hydraulic cylinder 50 extends is greater than a force generated when the hydraulic cylinder 50 contracts due to properties of the hydraulic cylinder 50.

One end of the third link 30 is rotatably coupled to the first link 10, and the other end of the third link 30 is rotatably coupled to the lower end of the second link and the fourth link 40. In this case one end of the third link 30 is rotatably installed at the lower end of the first link 10, the other end of the third link 30 is coupled to the lower end of the second link 20 to be rotatable about the third hinge shaft H3, and thus a rotation radius of the lower end of the second link 20 is restricted due to the third link 30.

One end of the fourth link 40 is rotatably coupled to the frame FR, and the other end of the fourth link 40 is rotatably coupled to the lower end of the second link 20 and the third link 30. In this case the fourth link 40 may have a length less than lengths of the first link 10 and the second link 20 like the third link 30. One end of the fourth link 40 is provided to be rotatable about the fourth hinge shaft H4 provided on the second connection part BK2, and the other end of the fourth link 40 is coupled to the lower end of the second link 20 to be rotatable about the third hinge shaft H3. In this case, the third hinge shaft H3 may be coupled to the third link 30 and the fourth link 40.

A lower end of the hydraulic cylinder 50 is coupled to the frame FR so that the hydraulic cylinder 50 is rotatable about the cylinder rotation shaft SR, and the upper end 51 is coupled to the second hinge shaft H2 to rotate the first link 10. For example, the hydraulic cylinder 50 may include a cylinder body and a cylinder rod which is extendable from or retractable into the cylinder body in a length direction. The lower end of the hydraulic cylinder 50 is coupled to the third connection part BK3 of the bracket BK to be rotatable about the cylinder rotation shaft SR, and the upper end 51 of the hydraulic cylinder 50 is coupled to the second hinge shaft H2.

In this case, the lower end of the hydraulic cylinder 50 is installed at a position under the first hinge shaft H1, and the first to fourth links 10, 20, 30, and 40 of the above-described structure are rotated in conjunction with each other in a complex manner according to extension and contraction operations of the hydraulic cylinder 50.

An operation process of the counterweight mounting device 100 will be described below. First, as illustrated in FIGS. 5 and 6, the link structure is rotated rearward to pull the counterweight CW. In a state in which the length of the hydraulic cylinder 50 is minimized (see FIGS. 5 and 6), the second hinge shaft H2 is disposed outside the slot guide SG, and the first link 10 is laid substantially parallel to the ground surface.

Figure 7:
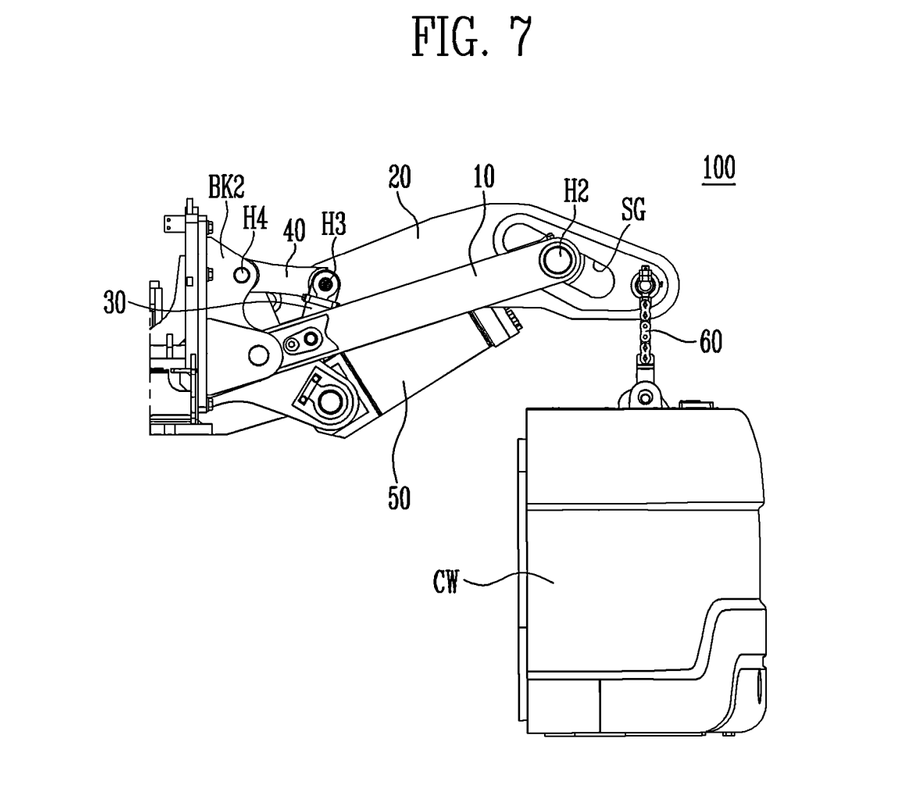

As illustrated in FIG. 7, when the hydraulic cylinder 50 extends slightly, the second hinge shaft H2 is pulled inward in the slot guide SG, the first link 10 is rotated about the first hinge shaft H1 due to complexly interconnected operation of the link structure, and the upper end of the first link 10 is moved upward. Accordingly, the counterweight CW connected to the connection member 60 is pulled upward.

Figure 8:
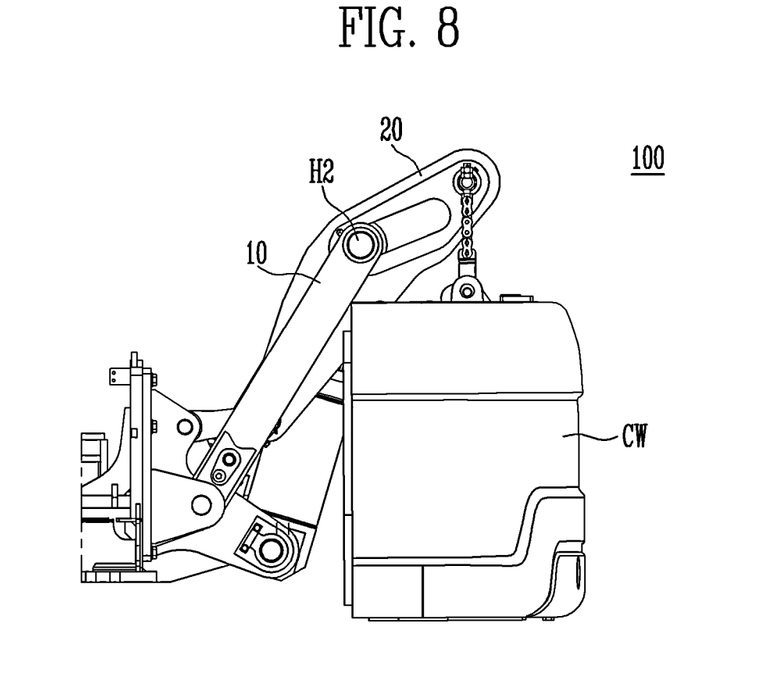

Next, when the hydraulic cylinder 50 further extends as illustrated in FIG. 8, and the hydraulic cylinder 50 extends to have a maximum length as illustrated in FIG. 9, the second link 20 and the third and fourth links 30 and 40 are folded, and the first link 10 stands to be substantially perpendicular to the ground surface.

In this case, during the process in which the hydraulic cylinder 50 extends, an upper end portion of the second link 20 has a trajectory in which the upper end portion is moved upward to a highest point and moved downward therefrom. Accordingly, the counterweight CW is stably seated on the counterweight rack FR1 without being interfered with by the frame FR. Conversely, when the counterweight CW mounted on the frame FR needs to be separated therefrom, the above-described process will be performed in reverse.

As described above, the counterweight mounting device 100 and the working machine according to the present embodiment can more accurately and safely transfer the counterweight CW. In addition, a problem in which a weight of the counterweight CW continuously affects the link structure so that the link structure is deformed and destroyed can be prevented.

In addition, since the counterweight mounting device 100 has a structure having a minimum volume and is installed on a conventional frame, a rotation radius of the counterweight is not increased in a rearward direction, and a manufacturing cost is economical.

According to the present invention, a counterweight mounting device and a working machine having the same can more accurately and safely transfer a counterweight. In addition, a problem in which a weight of the counterweight continuously affects a link structure such that the link structure is deformed or destroyed can be prevented.

In addition, when a transfer trajectory in which the counterweight is moved upward and downward to a seating surface is required to safely transfer the counterweight to the upper seating surface of a frame, the transfer trajectory can be obtained using a slidable link structure, particularly, a combination of four links.

In addition, since the counterweight mounting device has a structure having a minimum volume and is installed on a conventional frame, a rotation radius of the counterweight is not increased in a rearward direction, and a manufacturing cost is economical.

The present invention has been described in detail with reference to the exemplary embodiments. However, the exemplary embodiments should be considered in a descriptive sense only, and the present invention is not limited thereto. It should be clear to those skilled in the art that modifications and improvements thereof may be made within the scope of the invention.

Simple modifications and alterations of the present invention fall within the scope of the present invention which will be defined by the appended claims.

What is claimed is:

1. A counterweight mounting device, which is installed on a frame supporting a counterweight, comprising:
   a first link of which a lower end is coupled to the frame so that the first link is rotatable about a first hinge shaft;
   a second link including a slot guide into which a second hinge shaft coupled to an upper end of the first link is inserted and in which the second hinge shaft slides;
   a hydraulic cylinder of which a lower end is coupled to the frame so that the hydraulic cylinder is rotatable about a cylinder rotation shaft and an upper end is coupled to the second hinge shaft and rotates the first link; and
   a connection member installed on an upper end of the second link and connected to the counterweight.

2. The counterweight mounting device of claim 1, further comprising:
   a third link of which one end is rotatably coupled to the first link and the other end is rotatably coupled to a lower end of the second link; and
   a fourth link of which one end is rotatably coupled to the frame and the other end is rotatably coupled to the lower end of the second link.

3. The counterweight mounting device of claim 2, wherein a third hinge shaft coupled to the lower end of the second link is coupled to the third link and the fourth link.

4. The counterweight mounting device of claim 2, wherein the first to fourth links are provided in pairs at left and right sides around the hydraulic cylinder.

5. The counterweight mounting device of claim 2, further comprising a bracket which is fixedly coupled to the frame and to which the first link, the fourth link, and the hydraulic cylinder are rotatably coupled.

6. The counterweight mounting device of claim 1, wherein an upper end of the hydraulic cylinder is coupled to a center of the second hinge shaft.

7. The counterweight mounting device of claim 1, wherein the connection member is provided as a chain, a rope, or a combination thereof having a predetermined length.

8. A working machine comprising the counterweight mounting device of claim 1.

9. The working machine of claim 8, wherein the frame is provided on an upper rotation body of an excavator.

* * * * *